United States Patent Office

Re. 27,014
Reissued Dec. 29, 1970

27,014
METHOD FOR PRODUCING SINTERED FERROUS ARTICLE

Frank C. Russo, Parma, Ohio, by Ferro Corporation, Cleveland, Ohio, a corporation of Ohio, assignee No Drawing. Original No. 3,120,699, dated Feb. 11, 1964, Ser. No. 211,116, July 19, 1962. Application for reissue Nov. 25, 1968, Ser. No. 785,826
Int. Cl. B22f *1/00*
U.S. Cl. 29—182.5 8 Claims

Matter enclosed in heavy brackets [ ] appears in the original patent but forms no part of this reissue specification; matter printed in italics indicates the additions made by reissue.

My invention deals generally with an improved method for manufacturing sintered ferrous workpieces, and deals more particularly with a method for producing ferrous workpieces from powdered or granular ferrous material by compaction and sintering of said material, with the incorporation of elemental sulfur therein to improve strength characteristics of the finished article and improve the efficiency of the manufacturing process therefor.

A level of strength obtainable from iron powder, without the introduction of other alloying metals (such as nickel or chromium), is seriously limited in practice to values not substantially exceeding 100,000 p.s.i. on the standard fiber stress test (ASTM B312–58T). To attain this strength it is usually necessary in commercial practice to compress the powder, containing 1.2–1.5% graphite and 1% lubricant at about 50–60,000 p.s.i., and then to heat in a sintering furnace usually for not less than 30 minutes at 2050° F. (or for about 45 minutes including heat-up time), in an atmosphere which is conventionally "endo" or "exo" gas, or, less commonly, dissociated ammonia in order to maintain a substantially non-oxidizing atmosphere.

More strenuous conditions, e.g. higher compaction pressures, higher sinter temperatures, longer retention times, are sometimes employed but the gains in strength resulting therefrom are generally small, and the increase in cost of the operations is sufficiently great, that the industry has not found these lines of development particularly firuitful, although some variations in all these conditions are to be found in current practice.

In general, when it is necessary to obtain higher strength, alloying metals may be added (e.g., copper), or a variety of densifying and infiltrating techniques employed. These techniques have the effect of increasing density as well as strength, diminishing porosity, and in general, appreciably increasing cost.

It is therefore an object of this invention to provide a method for producing an improved metallic article.

It is also an object of this invention to provide a method of producing an improved ferrous article by compaction of powdered ferrous metal particles into the desired shape and sintering thereof.

Another object of this invention is to provide a sintered ferrous metal workpiece having improved properties of strength and hardness.

Other objects will appear from the following disclosure and claims.

I have found that in the conventional method of compacting powdered ferrous material under high pressures into a predetermined shape, followed by sintering of said shape to develop internal strength, the end product can be greatly improved by the addition of a quantity of elemental sufur to the powdered iron mix prior to compaction thereof.

Starting from the premise that, unlike metal parts formed machining solid non-porous masses of metal (like cast or rolled metal), powdered metal parts are only as strong as the bonds between adjacent discrete particles. I have found it possible, by the use of sulfur, to strengthen these bonds, the increased strength of such parts achieved at substantially very little additional cost; or, conversely, powdered iron parts of currently acceptable levels of strength can be produced at reduced cost.

I have also found that a mixture of sulfur with certain sulfur containing organic compounds is also useful. Such compounds are dithiooxamide, and derivatives thereof, tetraethylthiuram disulfide, etc.

My discovery I believe to be novel in view of the prior art, particularly U.S. Pat. 2,799,080 to Duckworth, wherein he prefers a sulphide for improving iron and lead solubility in a bearing alloy, with the suggestion that free sulfur would accomplish the same end. Opposed to the teachings of Duckworth, I have found, as will be explained in more detail hereinafter, sulphides are virtually useless for my purposes. Furthermore, Duckworth's sulfur is included as part of an iron-lead-sulfur alloy, whereas the sulfur of the present invention is added in the form of a powder to the pre-compacted mix, and would serve absolutely no purpose in achieving the objectives of my invention if incorporated either intentionally, or as an impurity, as part of my powdered metal mass as an alloy.

U.S. Pat. 2,970,052 to Wood illustrates the use of metal sulphides as a reactant to improve the strength of a sintered metal article. As will be shown hereinafter, sulfiides incorporated into my mix prior to compacting, provide no benefits for my purposes.

Summarizing these two examples of prior art, each teaches the benefits of a sulphide, which serves no purpose in realizing the utility of my invention, while one (Duckworth), also teaches the incorporation of sulfur into the mass of the alloy, a procedure which is, if anything, detrimental to the practice of my invention.

U.S. Pat. 2,942,334 to Blue teaches the use of $H_2S$ to form iron sulfide in situ prior to sintering, for essentially the same purpose as Wood. Blue's system apparently deriving its strength from ferrous oxysulfide inclusions which resist movement along the slip planes and grain boundaries of the iron crystals, a mechanism totally unrelated to mine.

Although not wishing to be bound thereby, in theory I regard sulfur as a localized energy source applied at precisely the points where such energy can be used to relieve interparticulate strain, and to effect the recrystillization which joins two particles by bonds approximating the strength of those within the particle. This energy is released by reaction of iron and sulfur at the surface of the iron. The heat of reaction is so great that the iron reaction product is probably liquefied locally, during sintering, or at least there is an incipient fusion which takes place at the point of contact of said particles.

The reaction of iron plus sulfur is an exothermic reaction, with the release of about 22,000 calories per grammole. This heat provides the energy necessary to incipiently melt (sinter) the surrounding materials which upon resolidification, form continuous crystallites extending from each particle to its neighbor. It will be readily seen that the simple introduction of a sulfide, as exhibited by the prior art discussed above (Wood and Blue) would be useless for the achievement of my result, inasmuch as iron sulfide would not constitute a source of sulfur capable of reacting with iron during the sintering process. Duckworth's incorporation of sulfur into the mass of the iron itself would, obviously, fail to provide reactive sulfur during sintering, as an energy source and an aid to interparticulate bonding.

The product of my reaction is quite compatible with iron in a metallurgically acceptable form; the structure of the final product of my invention being generally pearlitic in in structure, a desirable situation and one which obtains in commercial practice even without sulfur.

No pretreatment of the iron powder is necessary. In the preferred embodiment of my invention, using a good grade of relatively unoxidized iron powder, it is desirable to effect the initial iron-to-iron bond by compaction. The particles thus compacted would therefore be under greatest strain in the immediate vicinity of the contact points, and this increase in strain, considered as a form of potential energy, would, in effect, selectively activate this area for chemical reaction with our chosen additives. Thus sulfur would be expected to penetrate and react with the iron to promote crystal reorganization to relieve the strain and strengthen the interparticle bond.

The invention embodies the following advantages: Under standard conditions of power compaction and furnace treatment, it produces harder and stronger parts.

For equivalent strength the use of sulfur as described in this invention permits the following economies:

(1) Less metal need be used, saving raw material cost.

(2) A lower degree of compaction is required. This saves on the maintenance cost of the dies, in the amortization cost of the press (since smaller presses are adequate), and on the raw material cost of lubricant, since the lubricant needs increase at higher pressures.

(3) A lower temperature of sintering is required. This saves particularly on the maintenance cost of furnace heating elements, and to a smaller degree, on the cost of refractories.

In a typical test, powdered iron, lubricant, graphite and sulfur were dry mixed and tumbled until thoroughly mixed. A 30 minute mixing period was employed, although shorter periods are also adequate. The samples were compressed into test bars (¼" x ½" x 1¼"). The bars were then heated in a tube furnace. A preheating at 600° F. for 15 minutes was usually employed to simulate heat up time in large scale operations. Actual time in the sintering zone was typically 30 minutes (at 2050° F.). Some tests run at shorter or longer periods (e.g., 15 minutes to 60 minutes), simply reflect corresponding decreases or increases in strength comparable to those experienced by varying retention time with more conventional compositions. Similarly, higher or lower temperatures, e.g. (2000–2100° F.) reflect the expected increase in strength with temperature, for a given retention time. It should, however, be noted that the marked increase in strength produced by the composition of this invention enables one to operate at somewhat lower temperatures, or shorter retention periods than would otherwise be required to attain a specific strength.

Illustrations of this invention are shown in the following examples:

EXAMPLE 1

Transverse rupture strength for samples pressed at 50,000 p.s.i., sintered at 2050° F. for 30 minutes in a simulated "Endo" Gas (20% CO, 40% $N_2$, 40% $H_2$)[2]

[All samples contained 1%[1] zinc stearate, lubricant, and 1.1%[1] graphite]

| | Percent[1] sulfur in mix | Rupture strengths (p.s.i.) |
|---|---|---|
| (a) | 0.0 | 100,000 |
| (b) | 0.6 | 116,000 |
| (c) | 0.8 | 123,000 |
| (d) | 1.0 | 120,000 |

[1] Percent of additives throughout specification refer to parts by weight based upon 100 parts metal.

[2] Typical commercial endo gas containing 19% CO, 42.5% $N_2$, 38% $H_2$ and 0.5% ($CH_4$+$CO_2$) gives equivalent results.

EXAMPLE 2

Transverse rupture strength, as in Example 1, except that all compositions contained 1.25% graphite

| | Percent sulfur in mix | Rupture strengths (p.s.i.) |
|---|---|---|
| (a) | 0.0 | 100,000 |
| (b) | 0.5 | 133,000 |
| (c) | 0.75 | 123,000 |
| (d) | 1.0 | 121,000 |

A comparison of these examples shows that under reference conditions (0% sulfur), preparations with 1.1% graphite and 1.25% graphite both produced excellent strengths (100,000 p.s.i.). At 1.1% graphite the strength could be increased by about 20% by adding 1% sulfur. At 1.25% graphite the strength could be more than 30% by adding 0.5% sulfur, larger sulfur additions being without beneficial effect. The optimum amount of sulfur depends on the amount of graphite added, and on the furnace conditions employed. Usually some benefit can be found for sulfur additive at 0.2–1.5% sulfur.

An example of the effect of sulfur additive where there is relatively insufficient graphite by commercial standards is shown in Example 3.

EXAMPLE 3

Transverse rupture strength as in Example 1, except that the lubricant is 0.75% lithium stearate, and graphite content is 0.9%

| Percent sulfur in mix: | Rupture strength |
|---|---|
| 0.0 (est.) | 70,000 |
| 0.5 | 84,000 |
| 0.75 | 91,000 |
| 1.0 | 104,000 |

It will be noted that increasing sulfur concentration raises the strength from a distinctly substandard level (due to the lower level of graphite) to one which corresponds to good commercial performance. Although carbon is not theoretically absolutely essential to the benefits derived from sulfur during sintering, through its exothermic release, my preferred embodiment involves a minimum of 0.8% sulfur, by weight, of the mix since the optimum microstructure of the sintered ferrous article is, for most applications, pearlitic, as described above, which microstructure is normally associated with about 0.75 to about 0.85% combined carbon. As a portion of the carbon originally introduced is lost in gaseous by-products, it is generally undesirable to use compositions with much less carbon than approximately 0.5% in order to derive maximum utility from my invention.

An example of the effect of sulfur additive where low compaction pressures are used is shown in Example 4.

EXAMPLE 4

Transverse rupture strength as in Example 1, except that the samples were compacted at 35,000 p.s.i.

| Percent sulfur in mix: | Rupture strength (p.s.i.) |
|---|---|
| 0.0 (est.) | 80,000 |
| 0.5 | 90,000 |
| 0.75 | 96,000 |
| 1.0 | 98,000 |

Here increasing sulfur overcomes the loss in strength caused by low compaction pressure.

Example 5 illustrates the use of "exo" gas (containing typical 10% CO, 15–20% $H_2$, and the balance nitrogen, except for traces of methane and $CO_2$) with furnace temperature and retention times as in Example 1. Compaction pressure was 40,000 p.s.i. and the lubricant (Zn stearate was used in the range 0.93–1.14%).

EXAMPLE 5

Strength of iron sintered in exo-gas

| Percent sulfur | Percent graphite | Transverse rupture strength (p.s.i.) |
|---|---|---|
| 0.52 | 1.2 | 90,000 |
| 0.39 | 1.4 | 91,000 |
| 0.47 | 1.4 | 100,000 |
| 0.58 | 1.4 | 100,000 |
| 0.44 | 1.6 | 91,000 |
| 0.52 | 1.6 | 92,000 |

Thus at 0.47–0.58% sulfur, and 1.4% graphite strengths are obtained at 40,000 p.s.i. compaction which are normally not attainable, in the absence of sulfur, at pressures below 50,000 p.s.i.

By compacting at 60,000 p.s.i., it was possible to attain with the same range of sulfur, but at 1.6% graphite, strengths of 122,000–126,000 p.s.i., with no other change in furnace conditions. These strengths are beyond the range of those attainable in iron-graphite systems, without sulfur, in conventional commercial practice.

Although I have found the utility of this invention most applicable to systems whose metallic component is essentially iron, the principle of utilizing sulfur as an energy source to improve interparticulate bonding would obviously be applicable to any particulate metallic system wherein the main metallic component was reactive with sulfur and the strength of such system depended upon interparticulate bonds between particles of said main metallic component.

In iron systems, when carbon is added as graphite, at least 0.5% is preferably added, to develop the desired crystal structure. Quantities in excess of 2.0% are normally to be avoided because they interfere with the normal cohesion of the iron particles. When copper powder is used as a strength-inducing additive, the effects of the sulfur and the copper are not additive. At concentrations substantially in excess of 1% copper, the sulfur addition produces no significant improvement in the strength of the sintered iron part, sulfur performing essentially independently of copper. Although, while copper is not helpful to the achievement of strength through my invention, it of course could be tolerated to enhance some property of the system, other than strength.

Furthermore, small amounts of alloying metal, found in conventional ferrous alloys, e.g., 0–2% Mn in iron, do not interfere with the sulfur effect, and such alloys fall within the purview of this invention.

I have found that the use of iron powder containing alloyed or combined sulfur in the range 0–2% does not substantially improve the strength of the sintered metal, compared with the strength of the relatively sulfur-free iron used as a control. Thus commercial powdered iron containing 1.1% sulfur showed no significant advantages in strength over that containing less than 0.1% sulfur. This observation is consistent with my theory that the iron-contained sulfur cannot function as an energy source, and that it is not concentrated in areas of need.

Similarly, I have found that the addition of powdered metal sulfides (e.g., nickel sulfide) to the pre-compaction mix are not useful. While the sulfur (as sulfide) is now concentrated at the periphery of the iron particle, it lacks the ability to develop energy of reaction, and thus differs in utility from sulfur. Tests with 0–2.6% Ni sulfur show no strength advantage in adding the metal sulfide over a standard having neither the sulfur or sulfide addition.

I have also found that the purer forms of powdered iron are generally preferred for producing stronger parts than are iron powders covered by oxide layers. Thus commercial hydrogen reduced sponge iron is superior to iron powders which are either insufficiently reduced, or which are subsequently reoxidized.

The structure of the resulting iron mass shows an even pearlitic structure, with no significant foreign inclusions.

Correlated with the increased strength observed in transverse rupture tests, is a proportional increase in tensile strength, and in hardness. Thus where Rockwell B hardness of 40–50 are normally attained, the same furnace conditions will produce hardness in the range 60–70, when the sulfur additive is used.

The preferred concentrations of the sulfur is 0.1–1.5%, and its particle size is preferably not coarser than that of the iron powder with which it is used. Thus in general, the sulfur would be approximately −80 mesh, and preferably −150 mesh. However, it will be apparent that under certain conditions, sulfur content outside these limits would still result in some improvement over no sulfur.

In combination with my novel invention, any number of well-known lubricants may be utilized for expediting the compaction step, such as metal soaps, fatty acids, various derivatives of the fatty acids, etc.; such lubricants are fully compatible with my invention, and may be incorporated into the powdered metal mix, or applied either to the surface of the die wall, etc.

I claim:

1. In the method of producing a ferrous metal article by compacting discrete particles of ferrous metal, consisting essentially of a minimum of 95% Fe, into a cohesive shape then sintering same at at least 1950° F., the step of introducing elemental sulphur in intimately admixed relationship with said particles of ferrous metal prior to compaction and sintering, said elemental sulphur capable of reacting exothermally with at least part of said particles of ferrous metal during said sintering, following compaction thereof, to provide an auxiliary source of heat during sintering for incipiently fusing said powdered iron particles together to provide a coherent iron article having superior strength.

2. As an article of manufacture, a ferrous metallic article which is the product of a compacted and sintered mixture comprising particulate, ferrous metal consisting essentially of a minimum of 95% Fe, and particulate elemental sulphur, said article characterized by bonds of interparticulate links of incipient fusion between, and joining, said ferrous particles, which bonds are the combined effect of sintering and an exothermic reaction between said elemental sulphur and said ferrous metal, said exothermic reaction occurring during said sintering, and said article consists essentially of at least 94% said ferrous metal.

3. The method of producing a ferrous article comprising the steps of:

(a) thoroughly admixing from about 0.1% to about 2.0% elemental sulphur, and at least 0.5% carbon, with powdered iron particles, said quantity of sulphur and carbon based on 100 parts by weight of said iron, (b) compacting said admixture into a coherent shape at at least 25,000 p.s.i., and sintering, in a substantially non-oxidizing atmosphere, said compacted shape to provide a ferrous article having improved strength.

4. The method of producing a ferrous article comprising the steps of:

(a) thoroughly admixing from about 0.1% to about 2.0% elemental sulphur, and at least 0.5% carbon with powdered iron particles, said quantity of sulphur and carbon based on 100 parts by weight of said iron, (b) compacting said admixture into a coherent shape at at least 25,000 p.s.i., (c) sintering said compacted admixture at at least 1950° F. in a substantially non-oxidizing atmosphere, thereby inducing an exothermic reaction between said sulphur and said iron particles, (d) and incipiently fusing, at their points of contact, said particles of powdered iron, to provide a ferrous article having improved strength.

5. The method of producing a ferrous article comprising the steps of:

(a) thoroughly admixing from about 0.1% to about 2.0% elemental sulphur, and at least 0.5% carbon, with substantially oxide-free powdered iron particles comprising at least 95% Fe, said quantity of sulphur and carbon based upon 100 parts by weight of said iron, said iron particles constituting at least 95% of said mix, (b) compacting said admixture into a coherent shape, (c) sintering in a substantially non-oxidizing atmosphere at at least 1950° F., said compacted shape, thereby inducing an exothermic reaction between said sulphur and said iron particles, (d) concurrently with step (c) above, incipiently fusing, at their points of contact, said powdered iron particles to provide a ferrous article having improved strength.

6. The method of producing a ferrous article comprising the steps of:

(a) thoroughly admixing about 0.1% to about 2.0% elemental sulphur and not more than 2.5% graphite with substantially oxide-free powdered ferrous particles, said particles consisting essentially of 95% Fe, said quantity of sulphur and graphite based on 100 parts by weight of said iron, said ferrous particles constituting at least 95% by weight of said mix, (b) compacting said admixture into a coherent shape, at a minimum of 25,000 p.s.i., (c) sintering said compacted shape in a substantially non-oxidizing atmosphere, at at least 1950° F., (d) concurrently with step (c) above, exothermally reacting said elemental sulphur with said ferrous particles, (e) utilizing the heat resulting from the reaction of step (d) above combined with said sintering to promote bonds of incipient fusion between and joining said ferrous metal particles to provide a ferrous article having improved strength.

*7. In the method of producing a ferrous metal article by compacting discrete particles of ferrous metal, consisting essentially of a minimum of 95% Fe, into a cohesive shape then sintering same at at least 1950° F., the step of introducing from about 0.1% to about 2.0% elemental sulphur in intimately admixed relationship with said particles of ferrous metal prior to compaction and sintering, said elemental sulphur capable of reacting exothermally with at least part of said particles of ferrous metal during said sintering, following compaction thereof, to provide an auxiliary source of heat during sintering for incipiently fusing said powdered iron particles together to provide a coherent iron article having superior strength.*

*8. As an article of manufacture, a ferrous metallic article which is the product of a compacted and sintered mixture comprising particulate, ferrous metal consisting essentially of a minimum of 95% Fe, and particulate elemental sulphur in from about 0.1% to about 2.0%, said article characterized by bonds of interparticulate links of incipient fusion between, and joining, said ferrous particles, which bonds are the combined effect of sintering and an exothermic reaction between said elemental sulphur and said ferrous metal, said exothermic reaction occurring during said sintering, and said article consists essentially of at least 94% said ferrous metal.*

References Cited

UNITED STATES PATENTS

The following references, cited by the Examiner, are of record in the patented file of this patent or the original patent.

| | | | |
|---|---|---|---|
| 2,418,811 | 4/1947 | Adams | 75—211 |
| 2,783,208 | 2/1957 | Katz | 148—105 |
| 2,799,080 | 7/1957 | Duckworth | **29—182.5** |
| 2,803,863 | 8/1957 | Paudrat | 75—200UX |
| 2,942,334 | 6/1960 | Blue | 29—182.5 |
| 2,970,052 | 1/1961 | Wood et al. | 29—182.5 |

CARL D. QUARFORTH, Primary Examiner

A. J. STEINER, Assistant Examiner

U.S. Cl. X.R.

75—201; 148—105